3,833,543
TRIORGANOTIN SALTS OF THIOPHENE CARBOXYLIC ACIDS

Roger T. Guthrie, Westfield, and Bernard G. Kushlefsky, Edison, N.J., assignors to M & T Chemicals Inc., Greenwich, Conn.
No Drawing. Original application Sept. 11, 1972, Ser. No. 287,908. Divided and this application Aug. 31, 1973, Ser. No. 393,498
Int. Cl. C08f 45/62
U.S. Cl. 260—45.75 K     5 Claims

ABSTRACT OF THE DISCLOSURE

Triorganotin derivatives of mono- or dicarboxylic acids containing a thiophene ring structure are novel compounds that effectively inhibit the growth of microorganisms. The thiophene ring structure may contain inert substituents.

BACKGROUND OF THE INVENTION

This application is a divisional application of co-pending application Ser. No. 287,908, filed Sept. 11, 1972.

This invention relates to a novel class of triorganotin compounds. This invention further relates to a method for combating microorganisms using triorganotin compounds derived from carboxylic acids containing a thiophene ring structure.

Triorganotin compounds, particularly those containing lower alkyl radicals bonded to the tin atom, effectively inhibit the growth of a variety of undesirable life forms, including microorganisms and the barnacles and algae which are in large part responsible for fouling of ships and other structures that are exposed in a marine environment for extended periods of time. Many organotin compounds which otherwise would be desirable for these purposes are not practical due to certain shortcomings, e.g. excessive irritation of human skin, high volatility, or objectionable odors. Some organotin compounds are readily leached out of the substrate which they are intended to protect due to the excessive solubility of the compounds in water or other liquids with which the substrate is placed in contact.

One objective of this invention is to provide a novel class of organotin compounds. A second objective of this invention is to increase the efficacy of triorganotin compounds against microorganisms and other undesirable life forms by including other elements, for example, sulfur and halogens, which are present in numerous biologically active organic compounds.

SUMMARY OF THE INVENTION

The present invention provides organotin compounds of the general formula

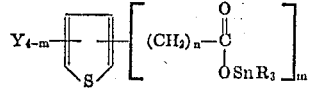

wherein each R is individually selected from the group consisting of alkyl, aryl, aralkyl, cycloalkyl, and alkaryl hydrocarbon radicals containing from 1 to 20 carbon atoms, each Y is individually selected from the group consisting of hydrogen and monovalent inert radicals, $m$ represents the integer 1 or 2 and $n$ represents an integer between 0 and 12 inclusive.

DETAILED DESCRIPTION OF THE INVENTION

Preparation of the Triorganotin Carboxylates

The triorganotin carboxylates of this invention are conveniently prepared by reacting a bis(triorganotin) oxide of the general formula $(R_3Sn)_2O$ or a triorganotin hydroxide of the formula $R_3SnOH$ with a mono- or dicarboxylic acid containing a thiophene ring structure. Alternatively, the compounds may be prepared by reacting a triorganotin halide of the general formula $R_3SnX$ with an alkali metal or alkaline earth salt mono- or dicarboxylic acid containing a thiophene ring structure.

The reaction between a bis(triorganotin) oxide or triorganotin hydroxide and the carboxylic acids described in the preceding section of this specification is carried out at temperatures between ambient and 200° C. A temperature above about 80° C. is preferred to obtain a useful rate of reaction and ensure that the reaction will go to completion. If one or both of the reactants are solid materials at ambient temperature, it is desirable to carry out the reaction in the presence of an inert liquid aliphatic, cycloaliphatic, or aromatic hydrocarbon which is a solvent for the reactants, the product, or all of these materials. Benzene is a preferred hydrocarbon because the boiling point of a reaction mixture prepared using this solvent is within the desired temperature range, thereby permitting the reaction to be carried out without the need for continuous monitoring of the temperature within the reaction mixture. Many of the reaction products are insoluble in cold benzene, thereby facilitating their isolation.

The reaction between the alkali metal salt of the carboxylic acid and the organotin halide can be carried out using a liquid aliphatic, cylcoaliphatic, or aromatic hydrocarbon diluent at ambient temperature. Heating is slightly elevated temperatures, e.g. 30–60° C. may be desirable to ensure completeness of reaction.

The Reagents

The triorganotin derivatives $(R_3Sn)_2O$, $R_3SnOH$, and $R_3SnX$, employed in preparing the novel compounds of this invention are either commercially available or can be synthesized using known procedures. Each R is individually selected from alkyl, aryl, cycloalkyl, aralkyl and alkaryl hydrocarbon radicals containing between one and twenty carbon atoms. The hydrocarbon radicals may also contain inert substituents, i.e. those which do not react with carboxylic acids or their salts. Examples of suitable inert substituents are alkoxy, aralkoxy, halogen, nitro, sulfo ($HO_3S$—), and alkanoyl

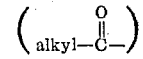

radicals. Halogen radicals may not be desirable for reactions employing a salt of the carboxylic acid, since it could yield undesirable byproducts.

Compounds of the formula $R_3SnX$ wherein the R radicals are identical hydrocarbon radicals can be obtained by reacting the appropriate Grignard reagent RMgX with a stannic halide $SnX_4$. The conditions for carrying out this reaction are described in the chemical literature and need not be discussed here.

"Asymmetric" triorganotin halides of the general formula $R_a^1R_{3-a}^2SnX$ wherein $R^1$ and $R^2$ represent different hydrocarbon and/or substituted hydrocarbon radicals selected from the same group as R, X is halogen, and $a$ represents the integer 1 or 2 can be prepared by reaction between two triorganotin halides of the formulae $R_3^1SnX$ and $R_3^2SnX$. The reaction is preferably conducted at temperatures between about 50 and 250° C. in the presence of a Friedel-Crafts catalyst, of which anhydrous aluminum chloride is an example. The products of the reaction are the two unsymmetrical triorganotin halides $R_2^1R^2SnX$ and $R^1R_2^2SnX$, which usually can be separated from one another and from the reactants by conventional methods such as fractional distillation and vapor phase chromotography.

Alkaline hydrolysis of a triorganotin halide yields the corresponding bis(triorganotin) oxide or triorganotin hydroxide, depending upon reaction conditions and the relative stability of the two products.

Mono- and dicarboxylic acids derived from thiophene are either commercially available or can be prepared from available reagents using known reactions of thiophene compounds. The acids employed to prepare the triorganotin carboxylates of the invention exhibit the general formula

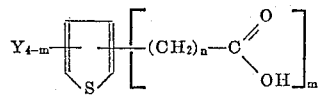

wherein Y is an inert substituent, i.e. one which will not react with carboxylic acids or the organotin compounds employed to prepare the carboxylates of this invention. Some of the suitable inert substituents are disclosed in a preceding section of this specification. The letter $m$ represents the integer 1 or 2 and $n$ represents an integer between 0 and 12 inclusive. The synthesis of thiophene mono- and dicarboxylic acids bearing a variety of substituents (represented by Y in the foregoing general formula) by ring closure reactions or by reactions of appropriate thiophene precursors is sufficiently described in the chemical literature that a detailed discussion of this subject is not required in the present specification. An excellent summary of this technology is contained in an article by Salo Gronowitz that appeared in Volume I of a text entitled "Recent Advances in Heterocyclic Chemistry," edited by A. Kalritzky (Academic Press, New York, 1963). Using known reactions for lengthening the hydrocarbon chains of carboxylic acids, a desired number of methylene radicals can be introduced between the carboxylic acid group $$(-\overset{O}{\underset{\parallel}{C}}-OH)$$

and the thiophene ring structure.

The corresponding acid anhydrides can be employed in place of the foregoing carboxylic acids. The following examples provide methods for preparing the novel compounds of this invention. The examples should not be interpreted as limiting the scope of this invention either with regard to the novel compounds or specific reagents which can be employed in their preparation.

EXAMPLE 1

Preparation of Triphenyltin-2-thiophene Carboxylates

A reaction vessel equipped with a motor driven agitator, reflux condenser, thermometer and a trap for selectively removing a portion of the liquid returning from the reflux condenser was charged with 36.0 g. (0.28 mole) of 2-thiophene carboxylic acid, 100.7 g. (0.14 mole) of bis(triphenyltin) oxide and 300 cc. of benzene. The reaction mixture was heated to reflux temperature during which time the water generated as a by-product of the reaction mixture was collected in the trap and removed. Heating was discontinued when no additional evolution of water was observed for about 15 minutes. The liquid portion of the reaction mixture was then separated and the benzene removed to yield 110 g. (82% yield) of a white solid melting between 113.0 and 114.8° C. which upon analysis was found to contain 25.05 weight percent tin. The calculated tin content for the carboxylate is 24.88 weight percent.

EXAMPLES 2–13

The compounds of Examples 2–13 were prepared using the same type of reaction vessel and a procedure similar to that described in Example 1. In all instances, the stoichiometric amounts of reagents were employed, i.e. one mole of triorganotin hydroxide or 0.5 mole of bis(triorganotin) oxide for each mole of monocarboxylic acid or one-half mole of dicarboxylic acid. The pertinent information for each of the syntheses is summarized in the accompanying table. The numbers in parenthesis following the definitions for $m$ and $n$ refer to the location of respective substituents on the thiophene ring structure as indicated in the general formula for the reaction. It should be understood that hydrogen is the substituent at all positions not occupied by bromine atoms.

TABLE I

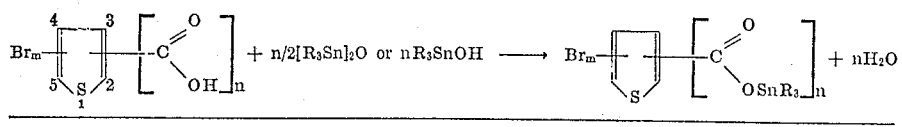

| Example No. | Organotin reagent | $m$ | $n$ | R | Percent yield | Melting range (° C.) | Percent by weight tin in product Calcd. | Found |
|---|---|---|---|---|---|---|---|---|
| 2 | Oxide | 0 | 1 (2) | n-Butyl | 98 | 64.6–67 | 28.45 | 28.45 |
| 3 | Hydroxide | 0 | 1 (2) | Methyl | ¹94 | 160.1–161.5 | 40.80 | 40.36 |
| 4 | do | 3 (3, 4, 5) | 1 (2) | Cyclohexyl | 98.3 | 85–88 | 16.22 | 16.81 |
| 5 | do | 3 (3, 4, 5) | 1 (2) | Methyl | 79.5 | 168.2–172 | 22.49 | 22.54 |
| 6 | Oxide | 3 (3, 4, 5) | 1 (2) | n-Butyl | 90.5 | Liquid | 18.37 | 18.15 |
| 7 | Hydroxide | 3 (3, 4, 5) | 1 (2) | Phenyl | 96.7 | 141–144 | 16.63 | 16.78 |
| 8 | do | 2 (3, 4) | 2 (2, 5) | Cyclohexyl | 96 | 175–178 | 22.31 | 22.50 |
| 9 | do | 2 (3, 4) | 2 (2, 5) | Phenyl | 85.5 | 177–178 | 23.09 | 23.5 |
| 10 | do | 2 (3, 4) | 2 (2, 5) | Methyl | 97.6 | (²) | 36.2 | 35.1 |
| 11 | Oxide | 2 (3, 4) | 2 (2, 5) | Butyl | 85 | ³ Liquid | 26.15 | 26.01 |
| 12 | Hydroxide | 0 | 2 (2, 5) | Pheny | 94 | 236.5–239 | 27.28 | 27.48 |
| 13 | Oxide | 0 | 2 (2, 5) | Butyl | 96 | 62.5–64 | 31.64 | 31.37 |

¹ Product precipitated upon cooling of reaction mixture.
² Above 300° C.
³ Product was a liquid at ambient temperature.

EXAMPLE 14

Preparation of 2-triphenyltin-5-tri-n-butyltin thiophene dicarboxylate

Using the procedure of Example 1, the reaction vessel was charged with 0.1 mole thiophene 2,5-dicarboxylic acid, 0.05 mole bis(tri-n-butyltin) oxide, 0.1 mole triphenyltin hydroxide and 250 cc. of benzene. The product isolated following heating of the reaction mixture to reflux temperature, melted between 198.5 and 203.2° C. and was obtained in 97.6% yield. Heating of the reaction mixture was continued until no water collected in the trap for at least 15 minutes.

The product was found to contain 29.53% tin (theory=29.30) and exhibited an acid number of 136 (theory=138.5).

The novel triorganotin carboxylates of the invention effectively inhibit the growth of a variety of undesirable microorganisms such as *Staphylococcus aureus* and other gram positive bacteria, *Pseudomonas aeruginosa* and other gram negative bacteria, and *Chaetomium globosum* and other undesirable fungi.

Solutions or dispersions of the triorganotin thiophene carboxylates of this invention can be applied to a substrate to be protected using conventional techniques, for example, dipping, spraying and brushing. A variety of aqueous and non-aqueous vehicles can be employed to prepare the dispersions. Suitable liquids include water, alcohols, ketones, hydrocarbons, esters, nitriles, sulfoxides, and carboxylic acids. Two or more of these liquids can be used in combination if they form a compatible mixture.

The organotin carboxylates of this invention are also desirable for use as the active ingredient in anti-fouling marine paints and as mildewcidal additives in latex paints. Compared with organotin compounds previously used for this purpose, e.g. bis-tripropyltin oxide and other trialkyltin compounds, the present compounds offer the advantage of lower volatility. In addition, the relatively high molecular weight of the present compounds makes it less likely that they will be prematurely leached out of the substrate to which they are applied. The characteristic odor of the lower trialkyl tins is also significantly decreased.

The amount of triorganotin compound required to control the growth of microorganisms is a function of the substrate to be protected and the type of organisms for which control is desired. Solutions or dispersions containing as low as 1 part per million of the triorganotin compound will control the growth of Staphylococcus aureus. Concentration of up to 1000 parts per million or higher may be required for certain strains of more resistant organisms, particularly the gram negative types of bacteria.

The triorganotin thiophene carboxylates can be applied to one or more surfaces of various materials, e.g. wood, metal, glass, and natural or synthetic polymers. The materials may be in the form of shaped articles, such as are formed by molding, casting, and extrusion. Alternatively, the triorganotin compounds can be incorporated into a bulk synthetic polymer prior to the shaping operation. This latter technique is particularly suitable for vinyl polymers, such as poly(vinyl chloride), and is also useful for other types of addition and condensation type polymers such as polyolefins, acrylic polymers, polyesters, polyamides, epoxide polymers, and condensation products of formaldehyde with phenols, ureas, and amines. Concentrations of triorganotin compound within the range between 0.05 and 20%, based on the weight of the bulk polymer composition will usually inhibit the growth of many types of microorganisms on the final product. The precise concentration level is a function of (1) the organisms prevalent at the location where the product will be used and (2) the presence of environmental conditions which may accelerate degradation of the organotin compound.

EXAMPLE 15

Evaluation of Organotin Thiophene Carboxylates as Bactericides for Control of Gram Positive Bacteria Petri dishes containing an agar gel as the nutrient medium were inoculated with Staphylococcus aureus 209. A circular section of gel, measuring about 4 millimeters in diameter, was removed from each dish and replaced with about 250 mg. of either tributyltin-3,4,5-tribromothiophene-2-carboxylate or bis(tributyltin)-3,4-dibromothiophene-2,5-dicarboxylate. These two cultures will hereinafter be referred to as A and B, respectively. The cultures were then incubated for 48 hours at a temperature of 37° C., together with a control (culture C) which did not contain a triorganotin compound. Following completion of the incubation period, a substantially circular zone of inhibited or zero growth of Staphylococcus organisms was observed surrounding the area where the organotin compounds had been placed. In culture A, the outer edge of the zone was 3.0 to 3.5 millimeters from the perimeter of area containing the triorganotin compound. This distance was 4 millimeters in culture B. Culture C (the control) was completely covered with Staphylococcus colonies.

EXAMPLE 16

Evaluation of Organotin Thiophene Carboxylates for Control of Gram Negative Bacteria A nutrient medium was prepared as in Example 15, inoculated with Pseudomonas aeruginosa instead of Staphylococcus aureus, then treated as in Example 15 with bis(tributyltin) thiophene-2,5-dicarboxylate (culture D); tributyltin thiophene-2-carboxylate (culture E); triphenyltin tributyltin thiophene-2,5-dicarboxylate (culture F); and trimethyltin thiophene-2-carboxylate (culture G). After incubation for 48 hours at 37° C., cultures D, E, F, and G showed zones of inhibition ranging in width from between 2 and 6 millimeters from the perimeter of the area containing the organotin compound. A control culture containing no organotin compound was completely covered with colonies of Pseudomonas aeruginosa.

EXAMPLE 17

Evaluation of Organotin Thiophene Carboxylates for Control of Fungi

Nutrient medium was prepared as in Example 15, and inoculated with Chaetomium globosum and then treated as in Example 15 with bis(tributyltin) thiophene-2,5-dicarboxylate (culture H); tributyltin thiophene-2-carboxylate (culture I); triphenyltin thiophene-2-carboxylate (culture J); triphenyltin tributyltin thiophene-2,5-dicarboxylate (culture K); and trimethyltin thiophene-2-carboxylate (culture L). After incubation for 120 hours at 27° C., cultures H, I, J, K, and L showed zones of inhibition of greater than 10 millimeters in width from the perimeter of the area containing the tin compound. A control culture was completely covered with the fungus.

EXAMPLE 18

Antimicrobial Efficacy of Triorganotin Thiophene Carboxylates at Relatively Low Concentrations Trimethyltin thiophene-2-carboxylate and bis(tributyltin) thiophene-2,5-dicarboxylate were dissolved in ethanol and diluted to a concentration of 100 parts per million (p.p.m.). Triphenyltin- and tributyltin thiophene-2,5-dicarboxylate and bis(triphenyltin) thiophene-2,5-dicarboxylate, being insufficiently soluble in ethanol, were dissolved in acetone and diluted to 100 p.p.m. Each of these solutions were then further diluted to concentrations of 10 p.p.m. and one p.p.m. From each of the twelve solutions thus prepared, 0.1 ml. was removed and added to a test tube containing 10 ml. of a nutrient broth. The twelve experimental broth solutions, plus a control with only 8.1 ml. pure ethanol and no organotin compound in addition to the nutrient broth, were then inoculated with Staphylococcus aureus and incubated overnight at 37° C. The results of an inspection the following day are tabulated below, with bacterial growth indicated by (+), and no growth by (−).

| Compound | 100 p.p.m. | 10 p.p.m. | 1 p.p.m. |
| --- | --- | --- | --- |
| Trimethyltin thiophene-2-carboxylate | − | + | + |
| Bis(tributyltin) thiophene-2,5-dicarboxylate | − | − | − |
| Triphenyltin, tributyltin thiophene-2,5-dicarboxylate | − | − | − |
| Bis(triphenyltin) thiophene-2,5-dicarboxylate | − | − | − |
| Control (no organotin compound) | + | + | + |

The results of this experiment indicate that trimethyltin thiophene-2-carboxylate loses its efficacy against Staphylococcus aureus at concentrations below about 0.1 to 1.0 p.p.m. while the other three experimental compounds show efficacy at least as low as 0.01 p.p.m. Similar activity should be expected against Streptococci and other gram positive bacteria.

EXAMPLE 19

Control of Bacterial Growth on a Vinyl Plastic Surface

Sheets of polyvinyl chloride were prepared by milling together on a two-roll mill the following formulations.

|  | Compound | |
|---|---|---|
|  | M | C''' |
| Polyvinyl chloride (Diamond 40), | 100 | 100 |
| Stearic acid, g | 0.25 | 0.25 |
| An octyl epoxy stearate (Drapex ® 4.4), | 43.5 | 43.5 |
| Dioctyl phthalate, g | 43.5 | 43.5 |
| Bis(triphenyltin) thiophene carboxylate, | 0.75 | None |

Portions of the resultant sheets were placed in individual Petri dishes containing nutrient agar which had been inoculated with *Staphylococcus aureus*. After incubation overnight at 37° C., Compound M exhibited a zone of inhibition of 2.0 to 2.3 millimeters from the perimeter resin composition while the control compound C''' was overgrown with colonies of *Staphylococcus aureus*.

EXAMPLE 20

Control of Microbial Growth on Fibers treated with Organotin Thiophene Carboxylates Wool yarn was treated with a 7% solution of bis(tributyltin) thiophene-2,5-dicarboxylate. Short lengths of the treated yarn were placed in Petri dishes containing nutrient agar inoculated with *Staphylococcus aureus* (culture N) and *Chaetomium globosum* (culture O). After incubating culture N overnight at 37° C. and culture O for five days at 27° C., zones of inhibition measuring 10-13 mm. in width in culture N and 7-12 mm. in width in culture O were observed surrounding the treated yarn samples. Both yarn samples were rinsed once with benzene, dried, and the experiment repeated. The resultant zones of inhibition were within the ranges previously observed, indicating retention of the organotin thiophene carboxylates by the wool fibers. After soaking for four days in benzene to simulate multiple dry cleaning, the fibers exhibited zones of inhibition of 1-5 mm. against *Staphylococcus aureus* and 0-2 mm. against *Chaetomium globosum*.

Because of the chemical similarity of wool with other keratinoid tissues such as human hair and epidermis, the data from this experiment indicate that organotin thiophene carboxylates may be useful in combating such disorders as dandruff, where both microbial growth and rate of keratination of the tissues require control.

What is claimed is:

1. A shaped article comprising a natural or synthetic organic polymer composition which inhibits the development of microorganisms, wherein the agent inhibiting said microorganisms comprises an effective amount of a triorganotin carboxylate exhibiting the general formula

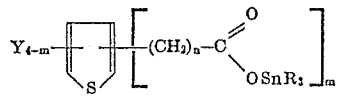

wherein each R is individually selected from the group consisting of alkyl, aryl, aralkyl, cycloalkyl, and alkaryl hydrocarbon radicals containing from 1 to 20 carbon atoms, each Y is individually selected from the group consisting of hydrogen and monovalent radicals, which are substantially unreactive in the presence of carboxylic acids or salts thereof, $m$ represents the integer 1 or 2 and $n$ represents an integer between 0 and 12 inclusive.

2. The shaped article of Claim 1 wherein said microorganisms are selected from the group consisting of *Staphylococcus aureus*, streptococci and fungi.

3. The shaped article of Claim 1 wherein the polymer is wool or poly(vinyl chloride).

4. A composition for imparting anti-microbial properties to articles wherein the major component is a natural or synthetic polymer, said composition comprising (a) a triorganotin carboxylate of the general formula

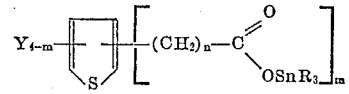

wherein each R is individually selected from the group consisting of alkyl, aryl, aralkyl, cycloalkyl, and alkaryl hydrocarbon radicals containing from 1 to 20 carbon atoms, each Y is individually selected from the group consisting of hydrogen or monovalent radicals which are substantially unreactive in the presence of carboxylic acids or salts thereof, $m$ represents the integer 1 or 2 and $n$ represents an integer between 0 and 12 inclusive, and (b) a liquid solvent or dispersant for said triorganotin carboxylate selected from at least one member of the group consisting of water, alcohols, ketones, hydrocarbons, esters, nitriles, sulfoxides and carboxylic acids, the concentration of said triorganotin compound being between 0.001 and 100 parts per million, based on the weight of said composition.

5. A poly(vinyl chloride) composition which inhibits the growth of microorganisms wherein the active ingredient comprises between 0.05 and 20%, based on the weight of said composition, of a triorganotin carboxylate of the general formula

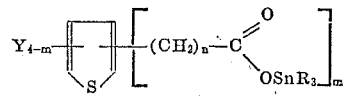

wherein each R is individually selected from the group consisting of alkyl, aryl, aralkyl, cycloalkyl, and alkaryl hydrocarbon radicals containing from 1 to 20 carbon atoms, each Y is individually selected from the group consisting of hydrogen and monovalent inert radicals, $m$ represents the integer 1 or 2 and $n$ represents an integer between 0 and 12 inclusive.

References Cited

UNITED STATES PATENTS 3,736,333    5/1973    Foster et al. _____ 260—329

V.P. HOKE, Primary Examiner

U.S. Cl. X.R.

106—15 AF; 117—138.5; 424—78, 83, 245; 260—329 ME